United States Patent [19]

Sasamura et al.

[11] Patent Number: 4,850,142
[45] Date of Patent: Jul. 25, 1989

[54] ARTICULATING VENT WINDOW ASSEMBLY

[75] Inventors: Ross S. Sasamura; John H. Jewell, II, both of Fremont, Calif.

[73] Assignee: PACCAR Inc, Bellevue, Wash.

[21] Appl. No.: 180,356

[22] Filed: Apr. 11, 1988

[51] Int. Cl.$^4$ .......................... E05D 15/00; E06B 3/34
[52] U.S. Cl. ........................................ 49/381; 16/332; 16/334; 49/144
[58] Field of Search ................. 49/381, 402, 400, 188, 49/144, 391, 390; 16/332, 334, 344, 335

[56] References Cited

U.S. PATENT DOCUMENTS

| | | | |
|---|---|---|---|
| 1,853,658 | 4/1932 | Briskin | 49/400 X |
| 1,861,828 | 6/1932 | Wright | 49/144 X |
| 2,211,665 | 8/1940 | Mackey | 49/144 |
| 2,240,790 | 5/1941 | Kuney | 16/334 |
| 2,262,644 | 11/1941 | Mackey | 49/144 |
| 3,562,955 | 2/1971 | Blomgren | 49/402 X |

FOREIGN PATENT DOCUMENTS

| | | | |
|---|---|---|---|
| 870150 | 3/1942 | France | 49/144 |
| 484028 | 4/1938 | United Kingdom | 49/144 |
| 519163 | 3/1940 | United Kingdom | 49/144 |

*Primary Examiner*—Philip C. Kannan
*Attorney, Agent, or Firm*—Flehr, Hohbach, Test, Albritton & Herbert

[57] ABSTRACT

An articulating vent window assembly is provided wherein a vent window is pivotally mounted with respect to a sealing element for adjustment between a closed and an open position. A pivot mechanism is mounted near a peripheral edge of the vent window, providing articulation of the vent window around a pivot axis in proximity and substantially parallel to one of the peripheral edges of the vent window. The articulating vent window is adjustable between a closed position and at least one discrete open position by engagement of the pivot mechanism with spaced grooves provided in a corresponding detent member. A method for pivotally mounting a vent window in a vent window sealing element is also disclosed.

19 Claims, 2 Drawing Sheets

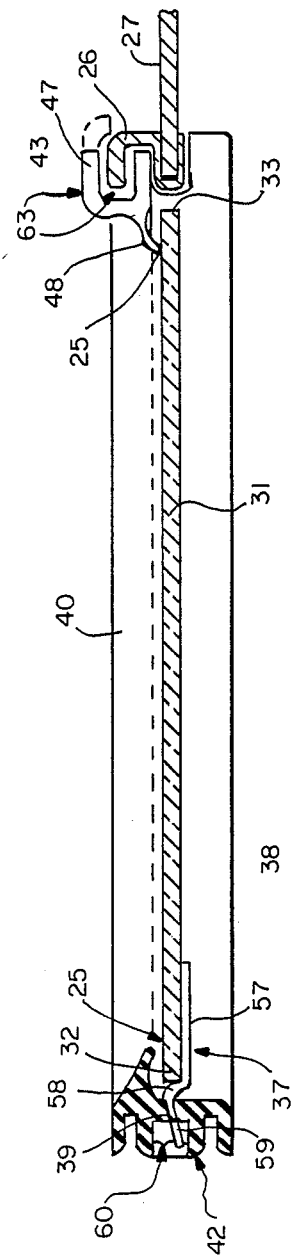
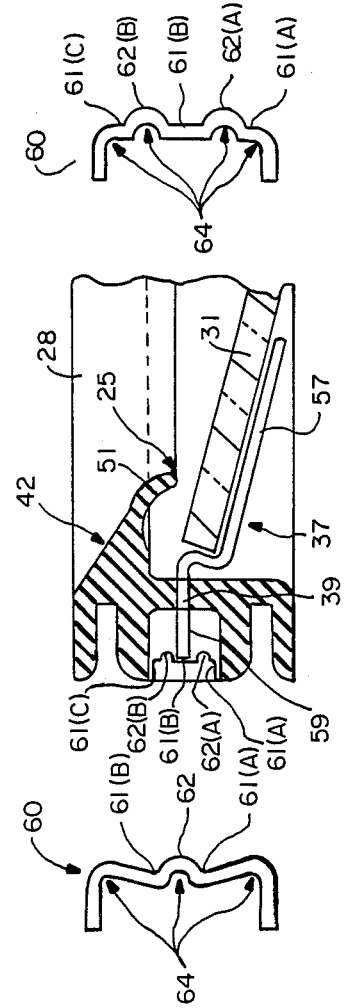
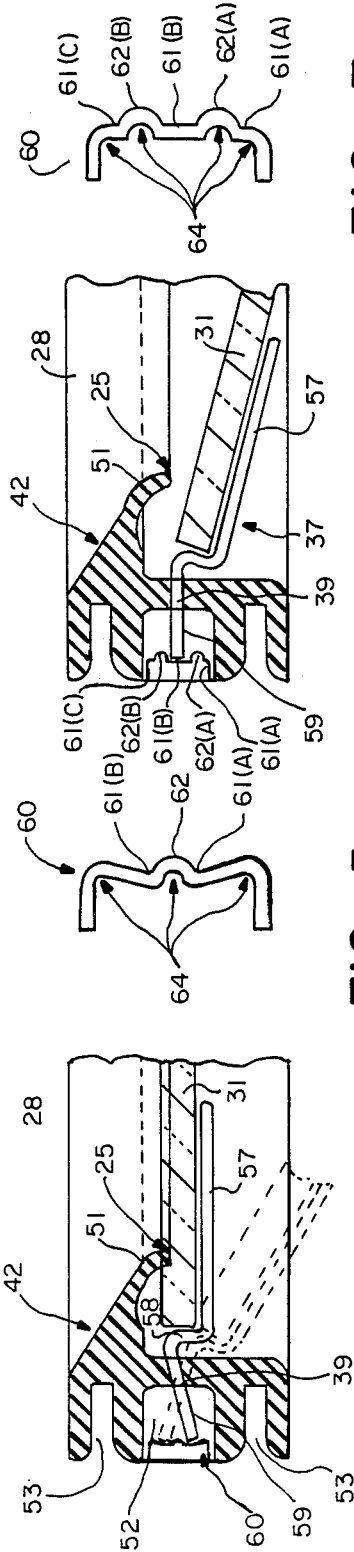

ARTICULATING VENT WINDOW ASSEMBLY

TECHNICAL FIELD

The present invention relates generally to vent window assemblies for use in motor vehicle door assemblies and the like, and relates more specifically to an articulating vent window assembly having a vent window pivotally mounted with respect to a vent window sealing means for adjustment of the window between a closed position and an open position by rotation of the window around its pivot axis.

BACKGROUND ART

Motor vehicles are conventionally provided with articulating vent or wing windows located in the area of the front upper corner of the front entry door assemblies. The vent windows provide ventilation and evacuation of stale air from inside the motor vehicle without opening the larger window conventionally mounted in the door.

Vent windows mounted in motor vehicle door assemblies conventionally incorporate pivot mechanisms arranged at or near the top and bottom edges of the vent window. For example, FIG. 1 illustrates a conventional motor vehicle vent window assembly wherein vent window 12 is pivotable about pivot axis 15 by means of pivot mechanisms 13 and 14 located near the top and bottom edges, respectively, of vent window 12. The vent window may be enclosed in a metallic or other framework, and window handle and latch means 16 is operatively attached to the vent window and/or its framework. Vent window seal 17 is provided around the periphery of vent window 12 to seal the vent window along its interior peripheral surfaces when the vent window is in the closed position.

Due to the arrangement of vent window pivot mechanisms 13 and 14 and pivot axis 15, the vent window continuously contacts the window seal 17 in the area of the pivot mechanisms during articulation of the vent window between open and closed positions. Interference between the vent window and the vent window seal causes heavy wear and degradation of the vent window seal in the area of the pivot axis. Articulation of the vent window about pivot axis 15 additionally results in interference between pivot mechanisms 13 and 14 and vent window seal 17. Although the vent window seal is designed to prevent leakage of liquids and gases from outside the vent window to the interior of the motor vehicle, use of vent windows of the type described above may result in deterioration of the window seal to the extent that its sealing properties are significantly impaired.

Since the exterior ambient air conditions may be unpleasantly hot, cold, dusty, wet, or the like, it is often desirable to evacuate stale air from the interior of the motor vehicle without introducing a large volume of exterior ambient air into the motor vehicle. Conventional vent window assemblies, such as shown in FIG. 1, promote the inflow of exterior ambient air into the motor vehicle, since at least one edge of the vent window, leading edge 19 or trailing edge 20, projects inwardly from the contour of the motor vehicle door assembly when the vent window is in an open position. For example, if the vent window 12 is rotated in a counterclockwise direction indicated by arrow 21, leading edge 19 of the vent window projects inwardly from the contour of the motor vehicle door assembly when the vent window is in an open position. This tends to promote the inflow of exterior ambient air into the motor vehicle. Rotation of the vent window in a clockwise direction causes rear edge 20 to project inwardly from the contour of the motor vehicle door assembly, thereby directing exterior ambient atmosphere into the interior of the motor vehicle without providing any evacuation of the interior air.

Accordingly, it is an objective of the present invention to provide an articulating vent window assembly providing enhanced sealing between the vent window and the vent window seal.

It is another objective of the present invention to provide an articulating vent window assembly wherein interference between the vent window and pivot mechanisms and the vent window seal during opening and closing of the vent window is substantially eliminated.

It is yet another objective of the present invention to provide an articulating vent window assembly wherein the vent window contacts the vent window seal only when the vent window is in a closed and sealed position.

It is yet another objective of the present invention to provide an articulating vent window assembly which promotes evacuation of stale air from the motor vehicle interior when it is in an open position without directing large volumes of exterior ambient air into the motor vehicle interior.

DISCLOSURE OF THE INVENTION

The articulating vent window assembly of the present invention is particularly suitable for use in motor vehicles, such as automobiles, vans, truck cabs, and the like, and is especially preferred for use with Class 8 heavy duty truck cabs. A conventional vent window may be mounted in the vent window assembly of the present invention with the pivot axis of the vent window in proximity and substantially parallel to the leading edge of the vent window. The vent window seal contacts an interior peripheral surface of the vent window in the closed position to provide a substantially gas-tight and liquid-tight vent window seal. Pivot mechanisms are preferably mounted near the leading edge of the vent window permitting rotation of the vent window around the pivot axis in a counterclockwise direction outwardly from the motor vehicle door assembly. Due to the arrangement of the window seal and the vent window pivot axis, the window seal contacts the vent window only when the vent window is in the closed position, and deterioration of the window seal resulting from repeated contact between the vent window and the seal during opening and closing of the window is substantially eliminated. Since the vent window opens by pivoting outwardly substantially along its leading edge, the vent window assembly of the present invention promotes evacuation of stale interior air without introducing a large volume of exterior ambient air into the motor vehicle.

According to a preferred embodiment of the vent window assembly of the present invention, the vent window is adjustable from a closed position to a plurality of discrete open positions by engagement of a pivot mechanism mounted in proximity to the leading edge of the vent window with a corresponding detent member. The pivot mechanism is retainable in one of a plurality of spaced grooves provided in the detent member to maintain the vent window in the closed position or in one or more discrete open positions.

BRIEF DESCRIPTION OF THE DRAWINGS

The above-mentioned and additional features of the present invention will be best understood by reference to the following more detailed description read in conjunction with accompanying drawings, wherein like reference numerals designate like components, and in which:

FIG. 3 shows a partially sectional view of the articulating vent window assembly of the present invention, taken substantially along line 3—3 of FIG. 2;

FIG. 4 shows an enlarged partially sectional view of the articulating vent window assembly of the present invention, taken substantially along line 4—4 of FIG. 2;

FIG. 5 shows an enlarged top view of the detent member illustrated in FIG. 4;

FIG. 6 shows an enlarged partially sectional view of a preferred embodiment of the articulating vent window assembly of the present invention, taken substantially along line 6—6 of FIG. 2; and FIG. 7 shows an enlarged top view of the detent member illustrated in FIG. 6.

BEST MODE OF CARRYING OUT THE INVENTION

Figure 2:
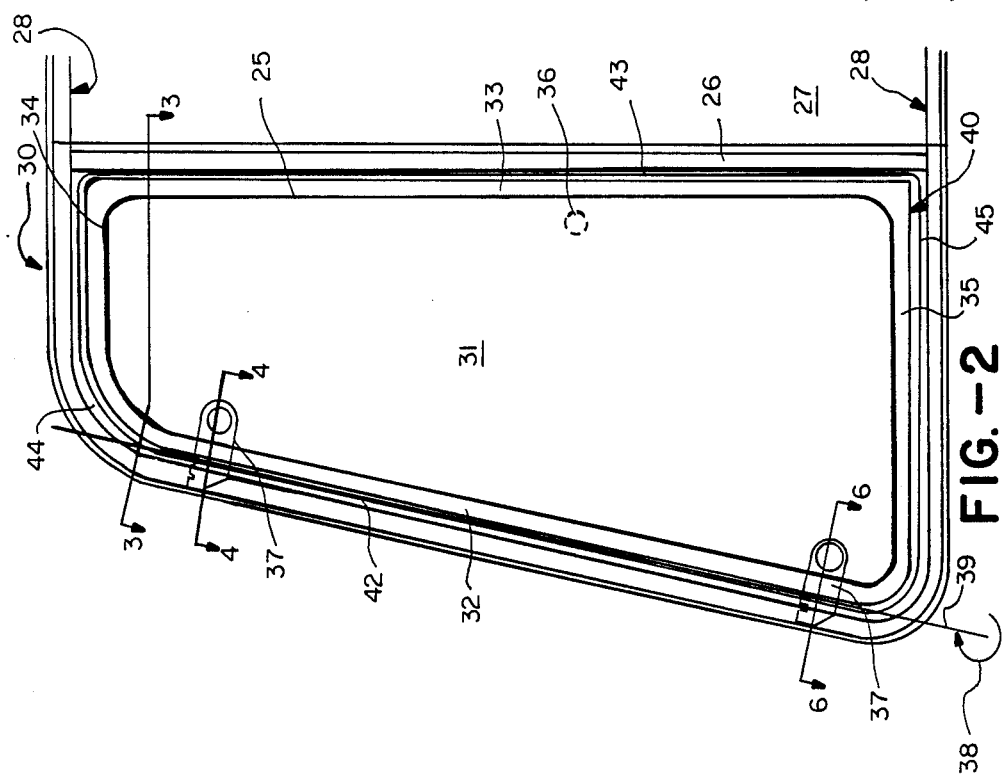
FIG. 2 shows a side view of the articulating vent window assembly of the present invention as viewed from the exterior of a motor vehicle.
Figure 1:
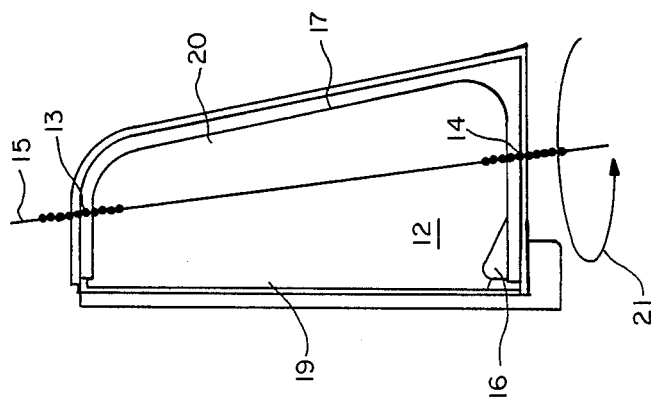
FIG. 1 shows a side view of a conventional prior art articulating vent window assembly.

As shown in FIG. 2, articulating vent window assembly 30 of the present invention includes vent window 31, illustrated as a conventional vent window having peripheral edges including leading edge 32, rear edge 33, top edge 34, and bottom edge 35. At least one pivot mechanism 37 is mounted on vent window 31 in proximity to leading edge 32 and, according to a preferred embodiment, two pivot mechanisms 37 are mounted on the vent window in proximity to leading edge 32, with one pivot mechanism mounted at an upper portion of leading edge 32 and the second pivot mechanism mounted at a lower portion of leading edge 32. Arrangement of pivot mechanisms 37 in this fashion permits articulation of vent window 31 about pivot axis 39 in proximity and substantially parallel to leading edge 32 of the vent window. Pivot mechanisms 37 are preferably mounted on an exterior surface of vent window 31.

The articulating vent window assembly also includes vent window seal 40 extending around the peripheral edges of the vent window, and including leading edge 42, rear edge 43, top edge 44 and bottom edge 45 adapted to provide a substantially liquid-tight and gas-tight seal 25 around the periphery of vent window 31 when the vent window is in the closed position. The vent window seal is preferably positioned to contact an interior surface of the peripheral edges of vent window 36. Thus, according to an especially preferred embodiment wherein the pivot mechanisms are mounted on an exterior surface of the vent window, and the window seal is positioned to contact an interior surface of the vent window, the pivot mechanisms operate outside the sealing surface and do not require any specialized sealing means. Window seal 40 of the vent window assembly is mounted in door frame 28 and incorporates slot 63 along its rear edge which receives side window run guide 26. Side window run guide 26 is permanently affixed to side window 27 and acts to stabilize the side window as run guide 26 translates vertically in slot 63 during opening and closing of side window 27. A suitable handle 36 or the like is preferably mounted on the interior surface of vent window 31 in proximity to its rear and/or bottom edges to facilitate opening and closing the articulating vent window.

Vent window 31 is preferably pivotable in a clockwise direction, indicated by arrow 38 in FIGS. 2 and 3, to open outwardly with respect to the door assembly. The vent window is pivotable in the opposite direction to close and seal the vent window with respect to the window seal. Due to the alignment of the vent window pivot axis according to the present invention, the vent window opens outwardly from the door assembly along its leading edge and promotes evacuation of stale air from the interior of the motor vehicle without directing exterior ambient air into the motor vehicle.

As shown in FIGS. 3, 4 and 6, pivot mechanism 37 includes first leg 57 fastened in proximity to leading edge 32 of the vent window by fastening means such as adhesives, mechanical fasteners, or the like. First leg 57 of the pivot mechanism is preferably mounted on the exterior surface of the vent window to avoid contact and interference with the vent window seal. First leg 57 of pivot mechanism 37 is connected to second leg 59 by means of intermediate portion 58. Second leg 59 is preferably oriented at an angle of about 5 to about 45 degrees with respect to first leg 57, and most preferably at an angle of about 10 to about 20 degrees. Second leg 59 of pivot mechanism 37 is mounted extending through leading edge 42 of the vent window seal in a pivotable manner permitting rotation of pivot mechanism 37 about pivot axis 39. Suitable pivotal mounting means are known in the art.

Detent element 60 having a plurality of spaced grooves 61 separated by raised portions 62 is preferably mounted for contact with second leg 59 of the pivot mechanism in leading edge 42 of the vent window seal, or in a portion of the door assembly framework. Detent element 60 may be provided as a unit extending from the upper pivot mechanism to the lower mechanism, but is preferably provided as a discrete detent element mounted in proximity to each pivot mechanism. Detent element 60 is constructed of a resilient material such as, but not limited to, spring steel. Adjustment of vent window 31 causes leg 59 of pivot mechanism 37 to translate across raised surface 62 of detent 60. To facilitate the translation of leg 59 across raised surfaces 62, detent element 60 yields slightly at sections 64.

As shown in FIGS. 4-7, second leg 59 of pivot mechanism 37 is retainable in grooves 61 to position the vent window in one of a plurality of discrete positions. According to the embodiment illustrated in FIGS. 4 and 5, for example, wherein detent element 60 is provided with two spaced grooves 61 separated by raised portion 62, the vent window is rotatable between a closed position indicated by solid lines and an open position indicated by dashed lines. In the closed and sealed position of the vent window, second leg 59 of pivot mechanism 37 is securely retained in groove 61(A) of detent member 60. Rotation of the vent window about pivot axis 39 causes second leg 59 of the pivot mechanism to slide over raised portion 62 of detent member 60 and catch in groove 61(B) to maintain the vent window in the open position indicated by dashed lines.

FIGS. 6 and 7 illustrate a preferred embodiment of the vent window assembly of the present invention wherein the vent window is adjustable from a closed position to two discrete open positions. In the closed and sealed position of the vent window, second leg 59 of pivot mechanism 37 is securely retained in groove 61(A) of detent member 60. Rotation of the vent window about pivot axis 39 in a clockwise direction causes second leg 59 of the pivot mechanism to slide over raised portion 62(A) of retaining member 60 and catch in groove 61(B) to maintain the vent window in a first open position as shown in FIG. 6. Further rotation of the vent window about pivot axis 39 causes second leg 59 of the pivot mechanism to slide over raised portion 62(B) of detent member 60 and catch in groove 61(C) to maintain the vent window in a second open position. Rotation of the vent window in the opposite direction about pivot axis 39 will adjust the vent window to the closed position. Additional grooves and raised portions may be provided in detent member 60 to maintain the vent window in a plurality of discrete open positions.

As illustrated in FIG. 3, window sealing means 40 may have a different cross-sectional configuration along different peripheral edges. For example, rear edge 43 of the window sealing means, as shown in FIG. 3, comprises generally C-shaped window sealing member 47 having contact sealing extension 48 extending therefrom. Generally C-shaped window sealing member 47 incorporates slot 63 to receive side window run guide 26 extending from a top to a bottom portion of the motor vehicle door framework, and contact sealing extension 48 is adapted for contacting and sealing the vent window when it is in the closed position. Leading edge 42 of the vent window sealing means preferably comprises a central channel 52 wherein detent member 60 is mounted, slots 53 provided on both sides of the central channel for engagement with corresponding ridges on the motor vehicle door framework, and contact sealing extension 51 for contacting and sealing the vent window when it is in the closed position. The top and bottom edges of the vent window sealing element are also provided with contact sealing extensions for sealing against a surface of the vent window when it is in the closed position, and are generally provided with appropriate slots for engagement with corresponding ridges on the motor vehicle door framework. The cross-sectional configuration of vent window sealing element 40 may be adapted as appropriate for engagement with the motor vehicle door framework.

Although preferred embodiments of the vent window assembly of the present invention have been described with reference to motor vehicle door assemblies, it will be recognized that the application of the present invention is not limited to motor vehicle door assemblies. The vent window assembly of the present invention may be adapted for use in other environments wherein a window, door, or the like is mounted for rotation about a pivot axis generally parallel to one edge of the window, door, or the like, and surface of the window, door, or the like contacts a sealing means when it is in a closed position.

While in the foregoing specification this invention has been described in relation to certain preferred embodiments thereof, and many details have been set forth for purposes of illustration, it will be apparent to those skilled in the art that the invention is susceptible to additional embodiments and that certain of the details described herein can be varied considerably with out departing from the basic principles of the invention.

What is claimed is:

1. A vent window assembly for a motor vehicle having a fore and aft section and a vent window frame, comprising:
   (a) a vent window having an interior and an exterior surface with respect to the motor vehicle and at least three peripheral edges;
   (b) a vent window sealing element having at least three edges corresponding to said peripheral edges of said vent window and formed to contact a peripheral surface of said vent window; and
   (c) a vent window positioning means disposed wholly within the vent window frame adjacent an axis substantially parallel to a peripheral edge for maintaining said vent window in a plurality of discrete positions, said window positioning means defining said plurality of discrete positions and including
     (1) at least one pivot mechanism mounted on said vent window in proximity to said first peripheral edge, said pivot mechanism providing rotation of said vent window about a pivot axis proximate and generally parallel to said first peripheral edge for allowing said vent window to move between a closed position and a plurality of discrete open positions.

2. A vent window assembly according to claim 1, wherein said first peripheral edge of said vent window is a forward, leading edge and said pivot axis is proximate and generally parallel to said forward, leading edge of said vent window.

3. A vent window assembly accordingly to claim 2, wherein said vent window sealing element is formed to contact an interior peripheral surface of said vent window.

4. A vent window assembly according to claim 3 wherein said pivot mechanism is mounted on said exterior surface of said vent window.

5. A vent window assembly according to claim 1, wherein said pivot mechanism comprises a first leg connected to a second leg by an intermediate portion and said second leg is oriented at an angle with respect to said first leg.

6. A vent window assembly according to claim 5, wherein said first leg of said pivot mechanism is mounted on said vent window.

7. A vent window assembly according to claim 6, wherein said first leg of said pivot mechanism is mounted on said exterior surface of said vent window.

8. A vent window assembly according to claim 5, wherein said second leg of said pivot mechanism is oriented at an angle of about 5 to about 45 degrees with respect to said first leg.

9. A vent window assembly according to claim 8, wherein said second leg of said pivot mechanism is oriented at an angle of about 5 to about 15 degrees with respect to said first leg.

10. A vent window assembly according to claim 5, wherein the vent window positioning means comprises a detent member cooperating with said pivot mechanism for maintaining said vent window in any of the plurality of discrete positions, said detent member having at least two grooves mounted in proximity to said second leg of said pivot mechanism.

11. A vent window assembly according to claim 10, wherein said detent member has two grooves separated by a raised portion, whereby said vent window is maintainable in a closed position by engagement of said second leg of said pivot mechanism in a first groove of said detent member, and said vent window is adjustable to an open position by rotation of said vent window about said pivot axis and engagement of said second leg of said pivot mechanism in a second groove of said detent member.

12. A vent window assembly according to claim 11, wherein said detent member has three grooves separated from one another by two raised portions, whereby said vent window is maintainable in a closed position by engagement of said second leg of said pivot mechanism in a first groove of said detent member, said vent window is adjustable to a first open position by rotation of said vent window about said pivot axis and engagement of said second leg of said pivot mechanism in a second groove of said detent member, and said vent window is adjustable to a second open position by further rotation of said vent window about said pivot axis and engagement of said second leg of said pivot mechanism in a third groove of said detent member.

13. A vent window assembly according to claim 1 wherein said vent window includes a leading edge, a rear edge opposite said leading edge, and top and bottom edges extending between said leading edge and said rear edge.

14. A vent window assembly according to claim 13, wherein said pivot mechanism is mounted in proximity to said leading edge, and said pivot axis of said vent window is in proximity and substantially parallel to said leading edge of said vent window.

15. A vent window assembly according to claim 1, wherein said vent window sealing element is formed to contact an interior peripheral surface of said vent window.

16. A vent window assembly according to claim 1, mounted in a motor vehicle door assembly.

17. In a vent window assembly, having a vent window frame, of the type wherein a vent window having at least three peripheral edges is rotatable about a pivot axis between a closed and an open position, and said vent window contacts a vent window sealing element in proximity to said peripheral edges of said vent window to seal said vent window in said closed position, said pivot axis arranged in proximity and generally parallel to one of said peripheral edges, the improvement comprising:

a vent window positioning means located wholly within said vent window frame adjacent an axis substantial parallel to a first of said peripheral edges for maintaining the vent window in a plurality of discrete positions.

18. In a vent window assembly according to claim 17, the further improvement comprising:

mounting a pivot mechanism for rotation of said vent window about said pivot axis on an exterior surface of said vent window and arranging said vent window sealing element to contact an interior surface of said vent window to seal said vent window in said closed position.

19. A method for mounting a vent window in a vent window sealing means for rotation of the vent window about a pivot axis between a closed position wherein the vent window contacts the vent window sealing means and an open position, said method comprising:

mounting a first leg of at least one pivot mechanism on said vent window in proximity to a first peripheral edge of said vent window;

mounting a second leg of said pivot mechanism in pivotal relationship through said vent window sealing means in proximity to said first peripheral edge of said vent window; and aligning said pivot axis in proximity and generally parallel to said first peripheral edge of said vent window.

* * * * *